(12) United States Patent
Martin

(10) Patent No.: US 11,622,624 B2
(45) Date of Patent: *Apr. 11, 2023

(54) PATIO TABLE WITH OPENING FOR OUTDOOR GAS HEATER

(71) Applicant: Todd Martin, Nipomo, CA (US)

(72) Inventor: Todd Martin, Nipomo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/829,190

(22) Filed: May 31, 2022

(65) Prior Publication Data

US 2022/0295983 A1 Sep. 22, 2022

Related U.S. Application Data

(63) Continuation of application No. 17/037,199, filed on Sep. 29, 2020, now Pat. No. 11,344,113.

(51) Int. Cl.
*A47B 37/04* (2006.01)
*A47B 13/08* (2006.01)
*F24C 3/00* (2006.01)

(52) U.S. Cl.
CPC ............ *A47B 37/04* (2013.01); *A47B 13/081* (2013.01); *A47B 13/088* (2013.01); *F24C 3/002* (2013.01)

(58) Field of Classification Search
CPC ..... A47B 37/04; A47B 13/081; A47B 13/088; F24C 3/022; A47J 37/0704; A47J 37/0786
USPC ............. 108/50.13, 115, 166, 176, 179, 187, 108/50.16; 312/290; 211/1.3, 2; 126/25 R, 26, 25 A, 9 R, 9 B, 33, 37 B
See application file for complete search history.

(56) References Cited

U.S. PATENT DOCUMENTS

| | | | | |
|---|---|---|---|---|
| 1,765,111 A | | 6/1930 | Warren | |
| 1,890,409 A | * | 12/1932 | Roberts | A47B 3/087 108/35 |
| 2,743,146 A | | 10/1952 | Wheeler | |
| 3,880,139 A | * | 4/1975 | Young | A47J 37/0763 126/552 |
| 4,899,027 A | | 2/1990 | Wong | |
| 4,962,697 A | | 10/1990 | Farrar | |
| 5,016,607 A | | 5/1991 | Doolittle et al. | |
| 5,165,385 A | | 11/1992 | Doolittle et al. | |
| 5,343,851 A | | 9/1994 | Cusson | |
| 5,794,546 A | | 8/1998 | Carter | |
| 5,865,099 A | | 2/1999 | Waugh | |
| 6,102,031 A | | 8/2000 | Waters | |
| 6,347,591 B1 | | 2/2002 | Karpa et al. | |
| D456,498 S | | 4/2002 | Jeng | |
| 6,766,747 B1 | * | 7/2004 | Wolfe | A47B 25/00 108/26 |
| D516,861 S | | 3/2006 | Nipke | |
| 7,296,522 B1 | | 11/2007 | Mahmalji | |
| 7,537,015 B1 | | 5/2009 | Molnar et al. | |
| 8,863,673 B2 | | 10/2014 | Diepenbrock | |
| D744,769 S | | 12/2015 | Ferrarese | |

(Continued)

*Primary Examiner* — Janet M Wilkens
(74) *Attorney, Agent, or Firm* — Sierra IP Law, PC; William K. Nelson

(57) ABSTRACT

An improved outdoor patio table with centrally secured outdoor patio heater, and methods of using the same are disclosed. The outdoor patio heater may be secured to the within the patio table without increasing the exterior perimeter of the patio table when securing or removing the patio heater. The patio table may be suitable for applications where there are a plurality of tables in a line and when a patio heater is removed frequently.

19 Claims, 4 Drawing Sheets

(56) References Cited

U.S. PATENT DOCUMENTS

| | | |
|---|---|---|
| D777,484 S | 1/2017 | Ferrarese |
| 2005/0161067 A1 | 7/2005 | Hollins |
| 2010/0078009 A1 | 4/2010 | Davis et al. |
| 2011/0146542 A1 | 7/2011 | Branning |
| 2013/0216213 A1 | 8/2013 | Thomas |
| 2014/0041556 A1 | 2/2014 | Diepenbrock |
| 2019/0301740 A1 | 10/2019 | Daniels |
| 2020/0191407 A1* | 6/2020 | Zemel .................... F24B 1/192 |

* cited by examiner

PATIO TABLE WITH OPENING FOR OUTDOOR GAS HEATER

FIELD OF THE INVENTION

The present invention relates generally to an outdoor patio table with a centrally secured outdoor patio heater and methods of using the same. More particularly, the present invention introduces a novel patio table operable to receive and secure an outdoor patio heater without increasing the exterior perimeter of the patio table when securing or removing the patio heater.

BACKGROUND OF THE INVENTION

Tower-style patio heaters are typically used in common outdoor areas to provide warmth when people are in the vicinity of the heater. An outdoor heater radiates heat to a general area and emits the heat in various direction, the direction of heat is determined from the geometry of the heating element of the tower heater. A conventional outdoor heater typically utilizes liquid propane gas or natural gas and feeds the gas through an array of nozzles to regulate the direction of the fluid; the fluid is then combusted with a spark to generate heat chemically. The fuel source is typically stored in a standard 20 lb propane tank and has a diameter of one foot. The tank is usually stored at a ground level and is concealed in an enclosure to remain unseen. Some heaters are of the electrical type and utilize a heating element typically manufactured of a material with a high melting point, high tensile strength, high resistivity, and does not oxidize in an open atmosphere such materials are nichrome and kanthal, but are not limited to such. In electrical heaters, the systems are typically powered from the nearest wall plug, but in some applications, the electrical heater is powered by an array of Li-ion batteries. The array of Li-ion batteries may be configured along the neck of the tower heater or as a large power bank at the base. Most heaters are of the conventional type, have a cylindrical heating element, and have a propane tank at the base. They are typically clunky and awkward to position in a space where many people may utilize the emitted heat.

An outdoor table having a tabletop and support structure for centrally placing a heater within the interior perimeter of the tabletop allows for people to gather around a common heating source for socialization. The outdoor tables available typically swing open in a lateral direction and allow the insertion of the patio heater, in such methods the space required to place the patio heater within the perimeter of the table is a large region and may even require doubling the ground space as the table typically swivels on a pin that is placed at the perimeter of the tabletop. In applications where there may be an array of patio table with centrally secured heaters the task of removing the patio heater may be cumbersome due to the lateral space requirements and require more than one person to move adjacent patio tables to accommodate the space when removing the gas heater or changing the fuel source.

Although many patio tables are configured to secure a patio heater, the patio tables have had deficiencies and drawbacks that are inconvenient when removal and insertion of the tower heater are performed frequently. An improved patio table for receiving a patio heater, without the need for additional space in the immediate area is needed.

SUMMARY OF THE INVENTION

The present invention provides an improved outdoor patio table having a tabletop and frame operable to secure a standard patio propane tower heater and methods of using the patio table. The patio table of the present invention has a tabletop that can transition from an open and closed position for receiving and enclosing a patio heater without increasing the exterior perimeter around the frame. The patio table may have a tabletop that may be divided into two or more portions that can be pivoted on the frame of the table like a hatch to open a central area of the table to accept the vertical neck of the propane tower heater. The two or more portions of the table top may then be lowered back to a closed, horizontal position, once the propane tower has been positioned in the central area of the table. The tabletop portions may have cutouts that meet when the two or more table top portions are lowered into closed, horizontal position, providing an aperture for accommodating the neck of a tower heater. The aperture size may vary, and the tabletop may be manufactured to accommodate different geometries and sizes of the neck.

The table may have a frame to which the table top portions are connected by hinge joints, allowing the table top portions to pivot and swing upward to open the middle area of the table. The frame may have one or more articulating crossmember that is able to transition from an open and closed position, the articulating crossmember when in the closed position is operable to be secured by a coupling mechanism to the frame. The one or more articulating crossmembers may be on a side that is aligned with the opening in the table top created by the upward pivoting of the one or more portions of the table top. The opening of both the two or more table top portions and the one or more articulating crossmembers provides a channel in the table that allows the propane tower to be moved into the central area of the table without obstruction, and the cross member(s) and the table top portions can be returned to a closed position, leaving the propane tower nested in a central area within the table and a complete table with a stable frame and table top with a complete, gapless perimeter.

The tabletop may have a flat top surface and a basal surface (e.g., the face that is adjacent to the ground and frame), the tabletop when in the closed position is perpendicular to the frame, and may be parallel to the ground. The tabletop portions may each be attached to a hinge (e.g., pivotal joint, butt joint, etc.) to the top surface of the frame. The hinge enables the tabletop to swing from the closed and open position about the hinge location. The tabletop when in the closed position may be secured together on the basal surface with a temporary securing mechanism (e.g., sliding bolt latch, magnetic lock, bolted, etc.); one of the securing components of the securing mechanism may have one end attached to one of the tabletop halves and the complementary component secured to the other half. The tabletop may have the temporary securing mechanism placed at various locations on the divided tabletop line.

The frame may have at least four legs, and the frame may be configured to have three rigid faces that may be in a fixed configuration and may have a fourth open face that is operable to receive the propane tower. The one or more articulating crossmembers may be connected to the frame at the fourth open face of the frame. The rigid faces of the frame may be constructed from an upper crossmember and lower crossmember that may be fastened (e.g., bolted, screwed, welded, etc.) between the adjacent legs. The upper crossmembers may be fastened to top (e.g., the highest location on the frame when in the final position) of the frame, the lower crossmember may be fastened between the ground and the upper crossmember. The frame may be constructed of wood, metals, plastics, and combinations thereof suited for outdoor use. The hinge may be attached to the upper crossmembers that are perpendicular to the open face of the frame, and the tabletop may be operable to swing to an open position from the hinge location.

The one or more articulating cross members may have two ends a proximal and distal end. The proximal end may be pivotally (e.g., rotatably) attached to a leg on the open face of the frame, and may freely swing about the point of attachment. The one or more articulating crossmembers may each have coupling mechanism at the distal end thereof. The coupling mechanism (e.g., sliding lock, magnetic latch, cam lock, etc.) may latch or otherwise connect to a receiver on the other leg of the open face of the frame to secure the articulating crossmember to the leg. The articulating crossmember(s) may be secured to the leg when the table is configured in the closed position. To open the table to allow the insertion of a propane tower, the distal end(s) of the articulating crossmember(s) may be disconnected from the receiver on the leg, and allowed to drop into a position in which it is parallel to the leg. In some embodiments, there may be at least two articulating cross members distributed on or between the open face of the frame.

When converting the table to an open configuration for receiving the tower heater, the temporary securing mechanism of the tabletop may be disengaged (e.g., bolt removed, unlatched), and the tabletop halves may be rotated to the open position with the tabletop portions positioned such that they are substantially parallel to the legs of the frame. The articulating crossmembers may then be positioned in the open position. The coupling mechanism may be disengaged (e.g., bolt removed, unlatched), and the articulating crossmembers may be rotated to the open position. Finally, the propane tower may be placed within the interior of the table. To secure the tower heater in the frame, the articulating crossmembers may be rotated to their closed position and fastened in place with the coupling mechanism, and the tabletop portions may be rotated to the closed position. The tabletop portions may be secured together. In the closed configuration, the heater neck may project from the neck port formed by cutouts from the portions of the tabletop, and the heating element is operable to heat the area over and around the table.

Furthermore, the patio table for receiving a tower heater is provided, the patio table comprising: a frame having an interior perimeter and an exterior perimeter configured from a plurality of legs, an upper crossmember, and a lower crossmember, and at least one open face; A tabletop having two halves pivotally attached on a basal face to the frame, and a neck port at or near a center of the table top; a plurality of swing crossmembers each having a proximal end and a distal end temporarily attached adjacently between the legs on the open face; An open position, wherein the articulating crossmember and tabletop are configured to access the interior perimeter for receiving or removing the tower heater without modifying the exterior perimeter; and a closed position, wherein the tabletop and the articulating crossmember is rigidly secured to the frame and configured to secure the tower heater in the interior perimeter.

In one aspect, the present invention relates to a patio table for receiving a tower heater, the patio table comprising a frame having an interior perimeter and an exterior perimeter configured from a plurality of legs, an upper crossmember, and a lower crossmember, and at least one open face; a table top having two halves pivotally attached on a basal face to the frame, and a neck port in the table top; at least one articulating crossmembers each having a proximal end and a distal end temporarily attached adjacently between the legs of the open face; an open position, wherein the articulating crossmember and tabletop are configured to access the interior perimeter for receiving or removing the tower heater without modifying the exterior perimeter; and a closed position, wherein the tabletop and the articulating crossmember, is rigidly secured to the frame and configured to secure the tower heater in the interior perimeter. The upper crossmember and the lower crossmember may be permanently fastened between adjacent legs on three faces of the frame. The interior perimeter may be adequate for storage and securing a fuel storage container of the tower heater. The tabletop halves may be pivotally attached to opposing ends on an upper face of the frame and are operable to swing out to a position parallel to the legs. The aperture may have a geometry complementary to a neck of the tower heater. The at least one articulating crossmember may be operable to swing out to a position parallel to the legs. The articulating crossmember may be pivotally attached at the proximal end to a leg of the open face, and has an aperture on the distal end to attach to the neighboring leg temporarily. The patio table may further include a locking mechanism for securing the articulating member the neighboring leg.

In second aspect, the present invention relates to a patio table for receiving a tower heater, the patio table comprising a frame having a plurality of legs, and at least one openable face; and a table top having at least two articulated portions operable to pivot relative to the frame, and a neck port operable to receive a neck of a tower-style patio heater, wherein the at least two table top portions can be pivoted away from the center of the table top such that the tower-style patio heater can be passed into or out of an interior of the frame. The patio table may further include at least one retractable crossmember at the openable face, wherein the at least one crossmember is movably attached to a first vertical member of the open face and is reversibly attached to a second vertical member of the open face, wherein the at least one retractable crossmember is operable to be removed from the second vertical member to open the at least one openable face to allow the tower-style patio heater to be passed into or out of an interior of the frame. The interior of the frame has a sufficient size to receive the tower-style patio heater. The at least two tabletop portions are pivotally attached to an upper face of the frame and are operable to swing outward from a center of the table top to a position substantially parallel to vertical members of the frame. The table top comprises a neck port for receiving a neck of the tower-style propane heater. The patio table may further include a connecting mechanism for securing the retractable member for connecting the retractable member to the second vertical member.

In a third aspect, the present invention relates to a method of nesting a tower-style patio heater in a table, comprising opening a table top of the table by pivoting independent portions of the table top outward from a center of the table top into an open position; retracting at least one retractable structural crossmember of a support frame to open a face of the support frame; passing the tower-style patio heater through the open face and between the pivoting independent portions of the table top such that the tower-style patio heater is positioned within an interior of the frame; reconnecting the at least one retractable crossmember to the frame to close the open face; and returning the pivoting independent portions to a closed position in which the independent portions are in a horizontal orientation forming the table top with a continuous perimeter. The at least retractable structural crossmember may be movably connected to a first vertical member of the frame. The method may include reconnecting the at least one retractable crossmember to the frame comprises attaching the at least one retractable member to a second vertical member with a coupling mechanism. The interior of the frame has a sufficient size to receive the tower-style patio heater. The tabletop halves may be pivotally attached to opposing ends on an upper face of the frame and are operable to swing out to a position parallel to the legs. The table top may include a neck port formed by cutouts in the pivoting independent portions of the table top, the neck port being operable to receive a neck of the tower heater.

Further aspects and embodiments will be apparent to those having skill in the art from the description and disclosure provided herein It is an object of the present invention to provide an upper crossmember, and lower crossmember are permanently fastened between adjacent legs on three faces of the frame.

It is a further object of the present invention to provide a frame with an interior and exterior perimeter; the interior perimeter having adequate storage for securing a fuel storage container of the tower heater.

It is a further object of the present invention to provide a tabletop divided into two halves, each being pivotally attached to opposing ends on the upper face of the frame and may be operable to swing out to a position that is parallel the legs.

It is a further object of the present invention to provide a tabletop with an aperture having a geometry complementary to a neck of the tower heater.

It is a further object of the present invention to provide at least one articulating crossmember placed between the open face of the frame and operable to swing out to an open position parallel to the legs of the frame.

It is a further object of the present invention to provide a pivoting attachment location on a leg for the articulating cross members proximal end, and a slot on the articulating crossmembers distal end to temporarily attach to the neighboring leg.

It is a further object of the present invention to provide a locking mechanism for securing the articulating member to the neighboring leg.

The above-described objects, advantages and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

DETAILED DESCRIPTION

Figure 1:
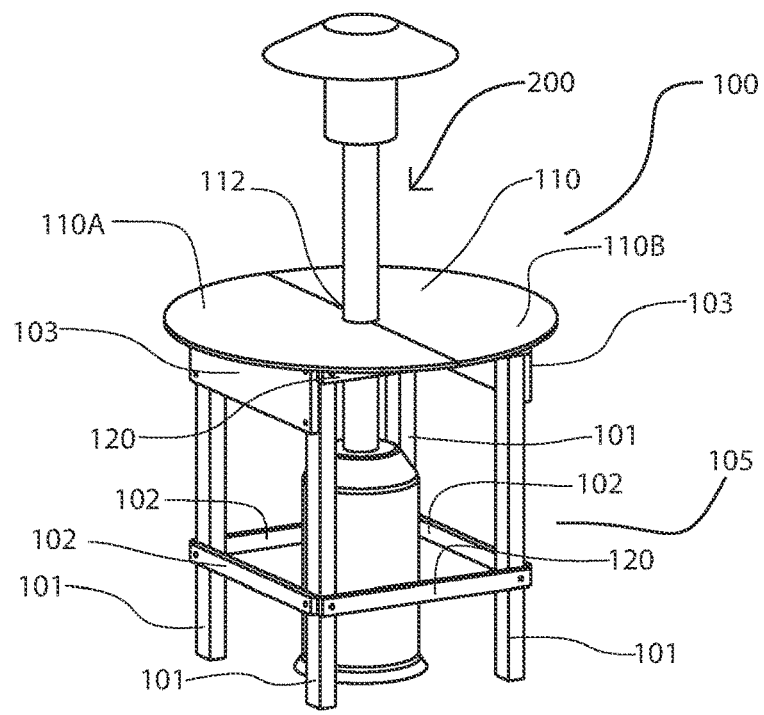
FIG. 1 provides a perspective view of a bar table apparatus, according to an embodiment of the present invention.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided.

The present invention concerns a patio table 100 suitable for surrounding an outdoor tower heater 200, the patio table comprising frame 105, a pivoting tabletop 110 having two halves, a pivoting attachment member 111 for securing the tabletop 110 to the frame 105 and allowing the tabletop 110 pivot from a horizontal position to an open position, and a pivoting crossmember 120 attached to at least one side of the frame 105. The pivoting crossmember may have a first or proximal end 120a and a second or distal end 120b, where the crossmember is pivotally attached on a first end 120a to the frame 105 and the second end 120b capable to temporarily anchor the crossmember 120 to the frame 105.

As seen in the exemplary embodiment of FIG. 1, a perspective view of a patio table 100 incorporating a tower gas heater 200 that may be centrally placed in the patio tabletop 100. Although the illustrated embodiment shows the patio table 100 having a substantially circular tabletop 110, the tabletop 110 may be provided in other shapes having a relatively square, rectangular, elliptical, hexagonal, and octagonal geometric shape having at least two portions that are each secured to the frame 105 on the basal surface of the portions of the tabletop 110. The two halves 110A and 110B may have an neck port 112 placed at or near the center of the tabletop 110 operable to secure the neck 201 of tower gas heater 200. Each of the two halves 110A and 110B may be attached to a hinged joint 111 (shown in FIG. 4) on the basal surface, the hinged joint having another end attached to the top surface of the frame 105.

Figure 2:
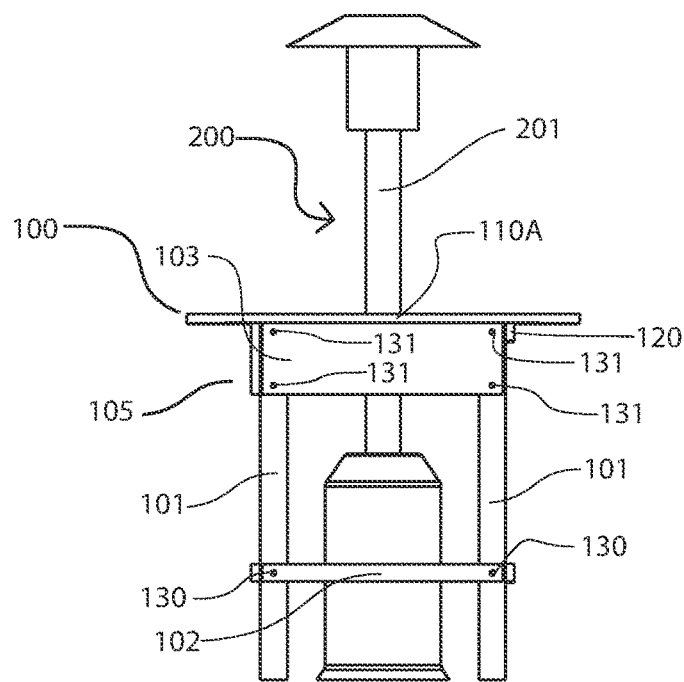
FIG. 2 provides a side view of a bar table apparatus, according to an embodiment of the present invention.

FIG. 2 shows an exemplary side view of the patio table of FIG. 1, the frame 105 comprising at least four legs 101, an upper crossmember 103, and a lower structural member 102. The upper crossmember 103 may be fastened between adjacent legs 101 on a proximal and distal end. The upper crossmember 103 may be fastened at the locations 131 to the legs 101. The lower structural member 102 may be fastened to adjacent legs 101 on a proximal and distal end and configured substantially parallel to the upper crossmember 103, and fastened at location 130.

The exemplary patio table 100 may include a frame having a tabletop 110 operable to pivot about the hinged joint 111 and the crossmembers 120 each being operable to transition from a closed and open position. The patio table 100 may have an open configuration to receive the heater 200 as shown in FIGS. 5-6, and a closed position that secures the heater 200 to bounds within the frame 105 and within the tabletop halves 110A and 110B.

Figure 3:
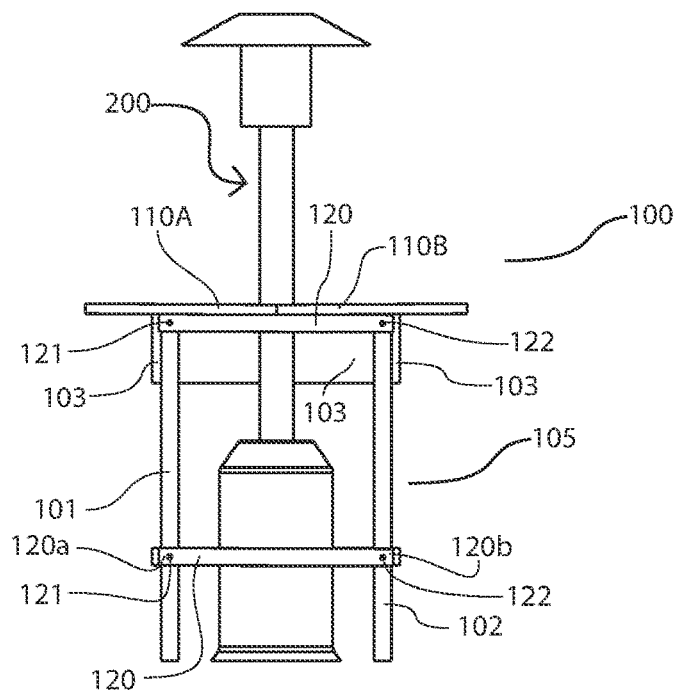
FIG. 3 provides a frontal view of a bar table apparatus, according to an embodiment of the present invention.
Figure 4:
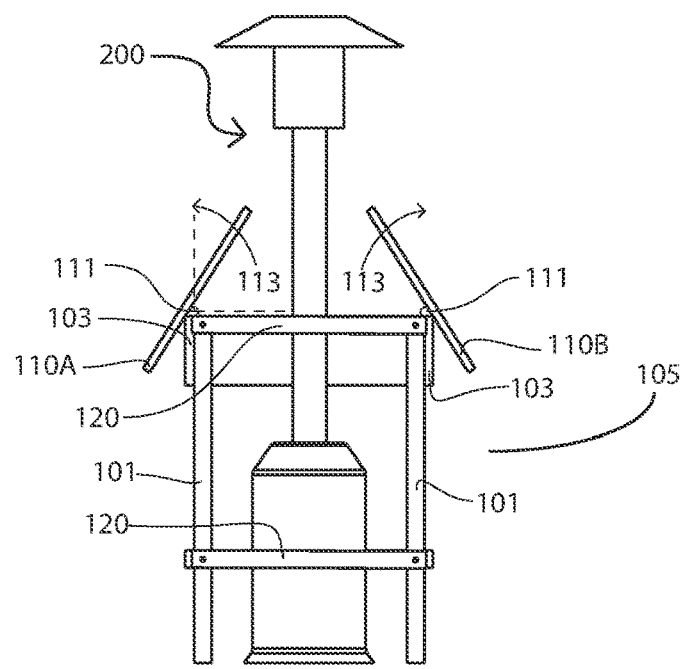
FIG. 4 provides a frontal view of a bar table apparatus, according to an embodiment of the present invention.
Figure 5:
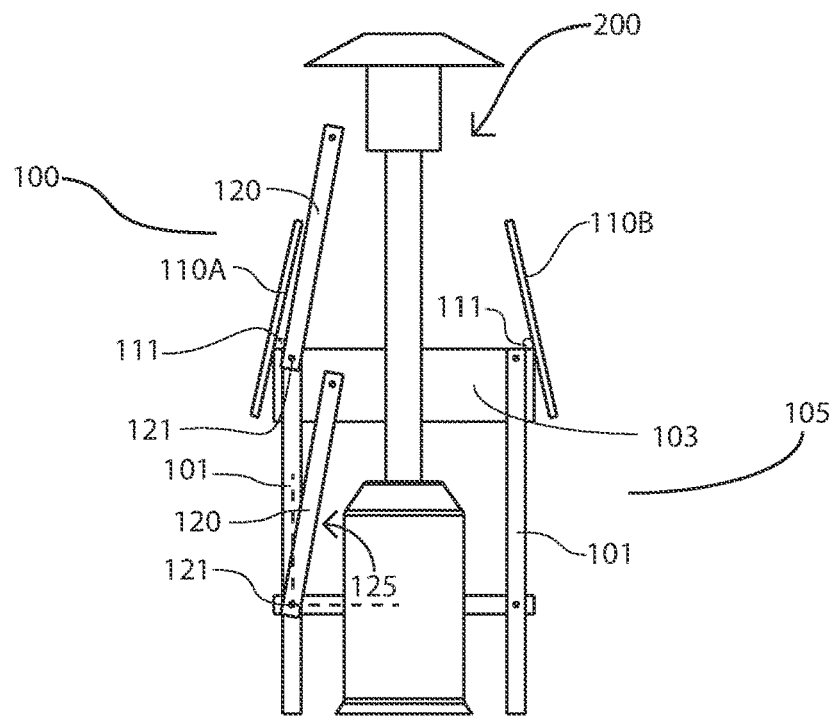
FIG. 5 provides a frontal view of a bar table apparatus, according to an embodiment of the present invention.
Figure 6:
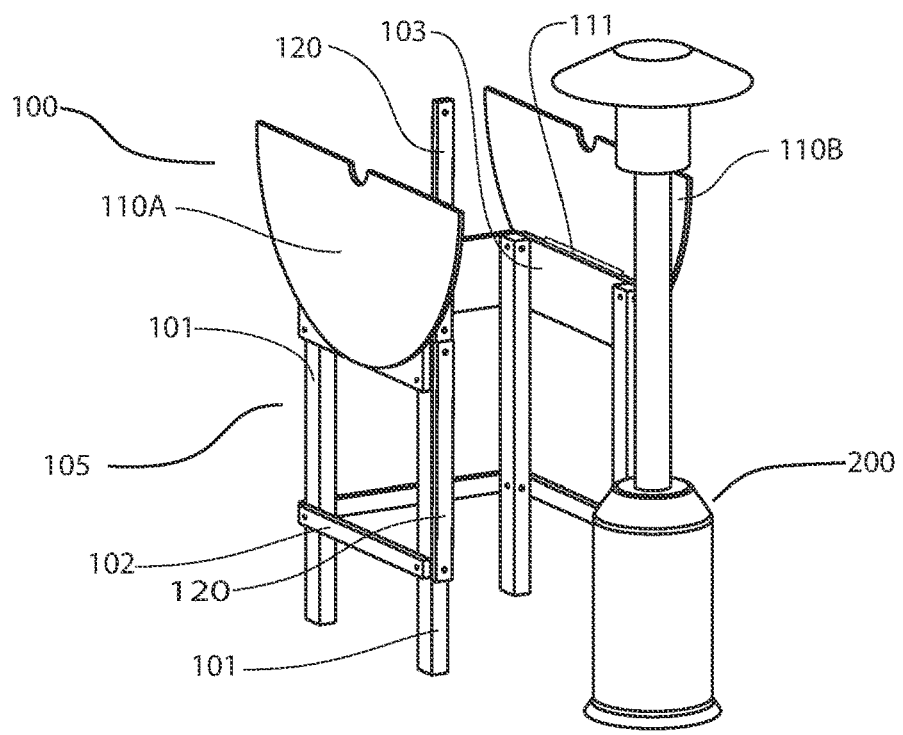
FIG. 6 provides a perspective view of a bar table apparatus, according to an embodiment of the present invention.

FIGS. 3-5 provides various frontal views of an exemplary patio table 100 with an opening for an outdoor gas heater 200, figures illustrating the sequential stages for removing and installing the gas heater 200 of the present invention.

FIG. 3 provides a closed configuration of the patio table 100; the closed configuration may arrange the tabletop 110 perpendicularly to the legs 101, the top faces of the tabletop halves 110A, 110B may be level, and the tabletop halves 110A, 110B may centrally secure the patio heater 200. The frame 105 on at least one face, may have at least one articulating crossmember 120 with a proximal end 120a and a distal end 120b, the proximal end 120a pivotally fastened to the leg 101 at 121 and the distal end being temporarily secured to the legs 101 with a pin 122. The articulating crossmembers 120 may be operable to rotate between a closed position and an open position; the crossmember 120 rotating about the fastening locations 121.

Referring to FIG. 4, an illustration of an intermediary stage for removing the patio heater 120. A tabletop half 110A may attach to a hinge 111 on the face adjacent to the frame, the hinge 111 adjacently attached to the trim of the top crossmember 103. The tabletop halves 110A, 110B may be operable to swing out from a pivoting axis of the hinge 111. The tabletop halves 110A, 100B may swing from the closed position to the open position along the path 113. The open position configures the tabletop 100 in an orientation that is parallel to the legs 101.

FIG. 5 provides an illustration of a final stage for configuring the tabletop 110 to the open position. A articulating arm 120 may be swung out from the closed position to the open position along path 125. The articulating crossmember 120 may rotate about the pivoting location 121 to the open position; the open position configures the articulating crossmember 120 to be substantially parallel to the legs 101. The table 100, when configured to the open position, may be operable to receive or remove the patio heater.

FIG. 6 illustrates the table 100, configured with the articulating crossmembers 120, and the tabletop halves 110A in the open position, and the gas heater pulled out of the patio table 100. The patio table of the present invention provides the advantage of allowing the gas heater from being removed and placed within the tabletop halves 110A, 110B without requiring additional space around the immediate area for removing the heater 200.

Figure 7:
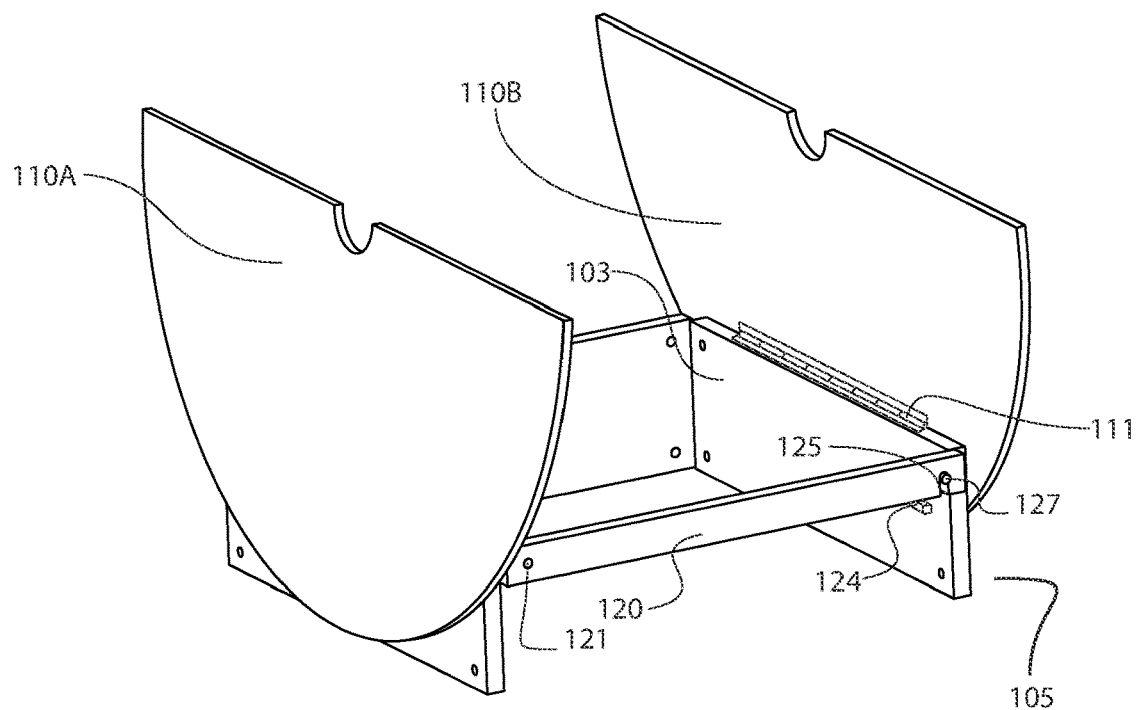
FIG. 7 provides a perspective view of tabletop and upper frame, according to the apparatus of FIG. 1.

FIG. 7 provides a close-up view of the upper frame 105, and the tabletop halves 110A, 110B in the open position. The hinge 111 may be attached to the upper crossmember 103 on the top face and may be attached to the underside of the tabletop half 110B; the hinge 111 may have a length suitable for stable movement from the open and closed position. The articulating crossmember 120 may have a slot 125 operable to slidably engage with a pin 127 affixed to the leg 101 of the frame 105. Articulating crossmember 120 may have a sliding lock 124 operable to secure the arm from swiveling freely from the closed position. The sliding lock 124 may be slidably attached to the underside of the articulating arm 120 and may fix to the distal end of the arm 120b.

Figure 8:
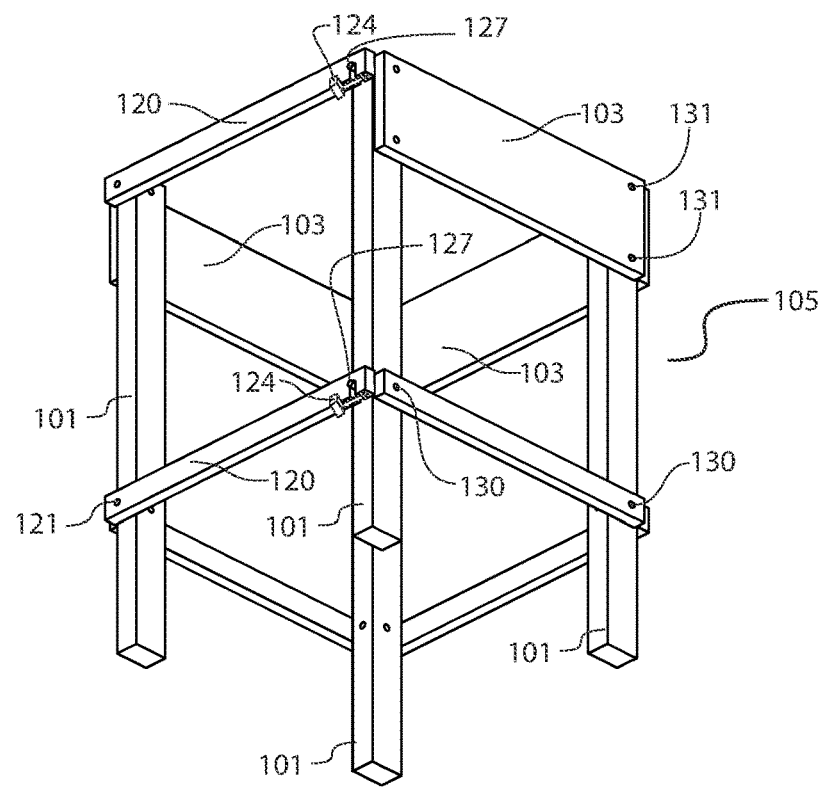
FIG. 8 provides a lower perspective view of the frame, according to the apparatus of FIG. 1.

FIG. 8 provides an underside perspective view of the frame 105 of the patio table 100 of FIG. 1, the table has at least four legs 101 and has at least three upper crossmembers 103, and at least three supporting members 102. The articulating crossmember 120 are operable to swing about the joint 121, and have a sliding lock 124 attached to the underside of the articulating member is operable to prevent rotation about the joint 121. When the sliding lock 124 is pulled towards the pivoting joint 121, and the articulating crossmember 120 may be rotated to the open position.

CONCLUSION/SUMMARY

The present invention provides an improved outdoor patio table with a centrally secured outdoor tower heater. The patio table configured to receive and secure an outdoor tower heater without modifying the exterior perimeter of the patio table. It is to be understood that variations, modifications, and permutations of embodiments of the present invention, and uses thereof, may be made without departing from the scope of the invention. It is also to be understood that the present invention is not limited by the specific embodiments, descriptions, or illustrations, or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. A patio table for receiving a tower heater, the patio table comprising:
   a. a frame having an interior perimeter and an exterior perimeter, and at least one openable side;
   b. a table top having two halves pivotally attached on an upper end of said frame to said frame, and an aperture in the table top;
   c. an open position, wherein
      i. said at least one openable side and tabletop are configured to access said interior perimeter for receiving or removing said tower heater, and
      ii. said two halves of said tabletop are pivoted on said upper end of said frame to create a gap between said two halves, wherein said gap allows access to said interior space for receiving or removing said tower heater; and
   d. a closed position, wherein said two halves are in a horizontal position such that they meet and create said tabletop and said openable side is closed and secured to said frame, such that said tower heater can be enclosed within the said interior perimeter between said two halves.

2. The patio table of claim 1, wherein said frame includes upper crossmembers and lower crossmembers that are permanently fastened between adjacent legs on three faces of said frame.

3. The patio table of claim 1, wherein said frame includes an interior space that is adequate for storage and securing a fuel storage container of said tower heater.

4. The patio table of claim 1, wherein said tabletop halves are operable to swing out to a position parallel to sides of said frame.

5. The patio table of claim 1, wherein said aperture has a geometry complementary to a neck of said tower heater.

6. The patio table of claim 1, wherein said openable side of said frame includes at least one articulating crossmember that is operable to pivot to a position parallel to vertical sides of said frame.

7. The patio table of claim 6, wherein said at least one articulating crossmember is pivotally attached at a proximal end to a vertical leg of said openable side, and has a connection mechanism on said distal end to reversibly attach to the neighboring leg of said openable side.

8. The patio table of claim 7, further comprising a locking mechanism for securing the articulating member said neighboring leg.

9. A patio table for receiving a tower heater, the patio table comprising:
   a. a frame having at least one openable side; and
   b. a table top having at least two articulated portions operable to pivot relative to said frame, and said at least two articulating portions meet to form an aperature operable to receive a neck of a tower-style patio heater, wherein said at least two table top portions can be pivoted away from the center of said table top such that said tower-style patio heater can be passed into or out of an interior of said frame.

10. The patio table of claim 9, further comprising at least one retractable crossmember at said openable face, wherein said at least one crossmember has a first end that is pivotally attached to a first vertical member of said openable side and a second end that is reversibly attached to a second vertical member of said open face, wherein said at least one retractable crossmember is operable to be removed from said second vertical member to open said at least one openable face to allow said tower-style patio heater to be passed into or out of an interior of said frame.

11. The patio table of claim 10, further comprising at least one articulating crossmember that is operable to pivot to a position parallel to vertical sides of said frame, the at least one articulating crossmember includes a connecting mechanism for securing the at least one articulating crossmember to the frame in a closed position.

12. The patio table of claim 9, wherein said interior of said frame has a sufficient size to receive said tower-style patio heater.

13. The patio table of claim 9, wherein said at least two articulating portions are pivotally attached to an upper end of said frame and are operable to pivot outward from a center of said table top to positions in which the at least two articulating portions are substantially vertical.

14. A method of nesting a tower-style patio heater in a table, comprising:
   a. opening a table top of said table by pivoting independent portions of said table top outward from a center of said table top into an open position;
   b. opening an openable side of a frame;
   c. passing said tower-style patio heater through said open side and between said pivoting independent portions of said table top such that said tower-style patio heater is positioned within an interior of said frame;
   d. closing said open side; and
   e. returning said pivoting independent portions to a closed position in which said independent portions are in a horizontal orientation forming said table top with a continuous perimeter.

15. The method of claim 14, wherein said openable side includes at least one retractable crossmember that is movably connected to a first vertical member of said frame.

16. The method of claim 15, further comprising attaching said at least one retractable crossmember to a second vertical member with a coupling mechanism.

17. The method of claim 14, wherein said interior of said frame has a sufficient size to receive said tower-style patio heater.

18. The method of claim 14, wherein said independent portions are pivotally attached to opposing ends on an upper end of said frame and are operable to swing out to positions that are substantially vertical.

19. The method of claim 14, wherein said table top includes an aperture formed by cutouts in said pivoting independent portions of said table top, said aperture being operable to receive a neck of said tower heater.

* * * * *